UNITED STATES PATENT OFFICE.

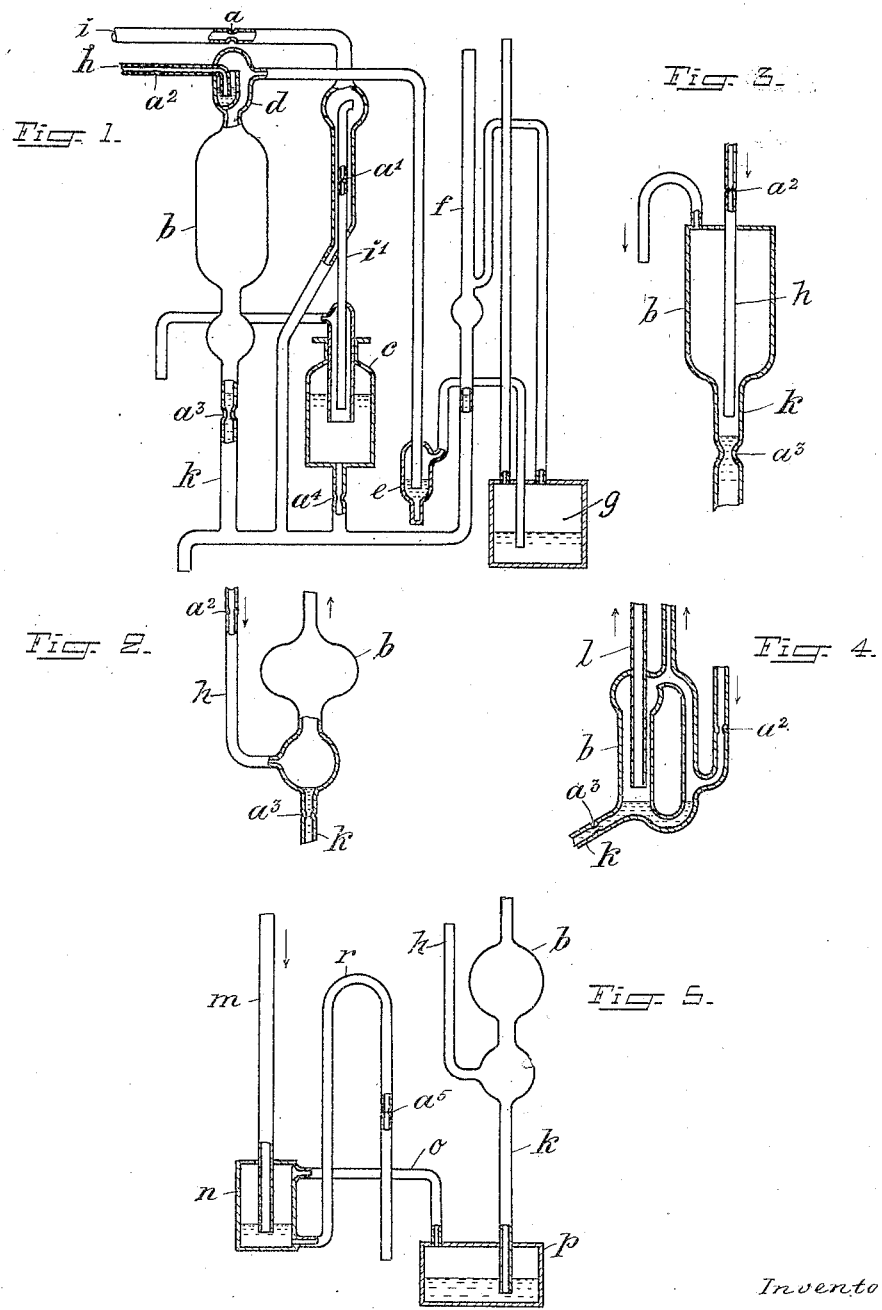

OLOF RODHE, OF STOCKHOLM, SWEDEN, ASSIGNOR TO AKTIEBOLAGET INGENIÖRS-FIRMA FRITZ EGNELL, OF STOCKHOLM, SWEDEN.

APPARATUS FOR ANALYZING GAS.

1,374,391. Specification of Letters Patent. Patented Apr. 12, 1921.

Application filed January 29, 1917. Serial No. 145,205.

*To all whom it may concern:*

Be it known that I, OLOF RODHE, subject of the King of Sweden, residing at Rörstrandsgatan 30, Stockholm, have invented certain new and useful Improvements in Apparatus for Analyzing Gas, of which the following is a specification.

This invention relates to an improved method of and apparatus for analyzing gas.

The invention consists in that the velocity of the gas current is diminished during a gas analysis where the gas or its parts are to be chemically or physically transformed or where one or more parts are to be removed or where the temperature or the percentage of moisture is to be altered. In this manner the time that is necessary for the transformation of the gas or its parts will be gained.

The streaming of the gas is preferably retarded before the gas has reached the usual first measuring receptacle, which can be effected by arranging a contraction in one of the piping connections. This contraction may be arranged in the gas inlet pipe or in the inlet or the discharge pipe for the pressure medium that effects the movement of the gas.

Some embodiments of the invention are shown in Figures 1–5 of the accompanying drawings, in connection with different gas analyzing apparatus of usual constructions.

In the embodiment according to Fig. 1 the reference letter $b$ indicates the first measuring receptacle in which a liquid is caused to rise and fall by means of the receptacle $c$ that forms part of a pumping apparatus according to the British Patent No. 16561 of 1908. The references $d$ and $e$ indicate liquid seals, $f$ shows an ascending pipe, $g$ an absorption receptacle, and $h$ an inlet pipe for the gas to be analyzed. The pipings $i$ and $i^1$ are used to convey the medium that drives the pump. The liquid reaches the measuring receptacle $b$ through the pipe $k$.

The contraction may be arranged at $a$, $a^1$, $a^2$, $a^3$, or $a^4$ that is in the discharge piping $i$ for the driving medium, in the discharge piping $l^1$ that in some embodiments has its outlet directly into the ascending pipe $f$, in the inlet piping $h$ for the gas, in the inlet piping $k$ for the liquid or in the ascending pipe to the receptacle $c$. The effect will be the same in all these cases namely the retarding of the gas current. In this embodiment pumping liquid introduced into the system by pipe $i$ will rise in pipe $k$ and receptacle $b$, receptacle $c$ and stand pipe $f$, thus driving a charge of gas from the receptacle $b$ through the water seal $e$ into absorption chamber $g$. When the pumping liquid has risen to the top of the vessel $c$, it will overflow, and by siphonic action the pumping liquid throughout the system will be reduced to a predetermined level whereby a measured quantity of gas will be drawn into receptacle $b$ through pipe $h$ and water seal $d$. The operation then proceeds as before.

Fig. 2 shows another embodiment, in which the piping $e'$ has its outlet directly into the measuring receptacle $b$. The contraction may be arranged in the pipe $e'$ at $a^2$ or in the pipe $k$ at $a^3$ as shown in Fig. 1.

Fig. 3 shows another embodiment in which the pipe $e''$ has its outlet into the measuring receptacle $b$. The contraction may, as in Fig. 2, be arranged at $a^2$.

In the embodiment according to Fig. 4 a gas discharge piping $l$ has its outlet into the measuring receptacle $b$ that consists of two communicating vessels. The contraction $a^2$ or $a^3$ may, as in Figs. 2 or 3, be arranged in the pipes $e'$, $e''$ or $k$.

In the embodiment according to Fig. 5, the measuring receptacle $b$ is connected by means of the pipe $k$ with the receptacle $p$. Water or some other driving medium enters through the pipe $m$, thus increasing the pressure in the said receptacle $n$. This increase of pressure is transmitted to the receptacle $p$ but will also cause the liquid in the pipe $r$ to rise. The liquid in $k$ and $b$ will also rise simultaneously. When the pipe $r$ is filled, it will act as a siphon and the predominating pressure in $o$ and $p$ will accordingly be equalized. The liquid thus falls in $k$ and $b$. In this embodiment the contraction may be arranged in the pipe $r$, for example at $a^5$, whereby the advantage is gained that the predominating pressure in $p$ only decreases comparatively slowly and accordingly also the liquid in $k$ falls slowly, so that the gas is only slowly drawn in through $h$.

In the embodiments shown the contraction has always been mentioned as stationary, but it may also be suitable to make the contraction movable or connect it by means of a branch piping or in some other way.

A similar arrangement will be of use if an apparatus is to be used for different purposes and intermittently with and without contraction. The contraction may also be made adjustable for example by making the cross section of the pipe variable. It is also possible to arrange several contractions in one pipe or in different pipes.

Claims.

1. In a gas analyzing apparatus in which gas is physically or chemically transformed, a pump, a measuring vessel, fluid piping communicating with said pump and said vessel, and contractions in portions of said piping.

2. In a gas analyzing apparatus in which gas is physically or chemically transformed, a pump, a measuring vessel, an absorbing chamber, fluid piping connecting said pump, said vessel and said chamber, and contractions in said pipe in advance of said pump, intermediate said pump and said vessel and intermediate said pump and said chamber.

In testimony whereof I affix my signature in presence of two witnesses.

OLOF RODHE.

Witnesses:
GRETA PRIEN,
ELIN WAHMAN.